United States Patent
Ruttenberg

(10) Patent No.: US 9,345,206 B2
(45) Date of Patent: *May 24, 2016

(54) APPARATUS AND METHOD FOR OPERATING PRESSURE-COMPENSATED DRIPPERS AT LOW FLOW RATES

(71) Applicant: Pulsating Irrigation Products, Inc., Temecula, CA (US)

(72) Inventor: Gideon Ruttenberg, Petach Tikva (IL)

(73) Assignee: Pulsating Irrigation Products, Inc., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,325

(22) Filed: Aug. 4, 2014

(65) Prior Publication Data

US 2014/0339324 A1    Nov. 20, 2014

Related U.S. Application Data

(63) Continuation of application No. 13/127,116, filed as application No. PCT/IL2009/001022 on Nov. 2, 2009, now Pat. No. 8,794,539.

(60) Provisional application No. 61/198,252, filed on Nov. 3, 2008, provisional application No. 61/215,916, filed on May 11, 2009.

(51) Int. Cl.
*A01G 25/02* (2006.01)
*A01G 25/16* (2006.01)

(52) U.S. Cl.
CPC .............. *A01G 25/165* (2013.01); *A01G 25/02* (2013.01)

(58) Field of Classification Search
CPC ..... A01G 25/02; A01G 25/023; A01G 25/16; A01G 25/162; A01G 25/165
See application file for complete search history.

(56) References Cited

U.S. PATENT DOCUMENTS

| | | | |
|---|---|---|---|
| 3,797,741 | A | 3/1974 | Spencer |
| 4,077,570 | A | 3/1978 | Harmony |
| 4,938,420 | A | 7/1990 | Ruttenberg |
| 5,224,653 | A | 7/1993 | Nelson et al. |
| 5,314,116 | A | 5/1994 | Krauth et al. |
| 5,353,993 | A | 10/1994 | Rosenberg |
| 5,409,168 | A | 4/1995 | Nelson et al. |
| 5,507,436 | A | 4/1996 | Ruttenberg |
| 5,531,381 | A | 7/1996 | Ruttenberg |
| 5,601,381 | A | 2/1997 | Hadar et al. |
| 5,727,733 | A | 3/1998 | Ruttenberg |
| 6,622,427 | B2 | 9/2003 | Breitner |
| 6,983,896 | B2 | 1/2006 | Zur et al. |
| 2002/0088877 | A1 | 7/2002 | Bertolotti et al. |
| 2003/0029929 | A1 | 2/2003 | Rosenberg |
| 2007/0282264 | A1 | 12/2007 | Shekalim |
| 2009/0032614 | A1 | 2/2009 | Ruttenberg |
| 2009/0184178 | A1 | 7/2009 | Roach |
| 2011/0147488 | A1 | 6/2011 | Walker et al. |

*Primary Examiner* — Darren W Gorman
(74) *Attorney, Agent, or Firm* — Rutan & Tucker, LLP

(57) ABSTRACT

Apparatus for operating a group of normally closed, pressure compensated drippers at relatively low liquid flow rates includes a pulsating device having an inlet and an outlet that converts a low continuous liquid flow rate entering its inlet, through a flow control unit, to a high intermittent and pulsating flow rate ejected through its outlet. A manifold has an inlet connected to the outlet of the pulsating device, a group of normally-closed, pressure-compensated drippers being connected to the manifold. The pulsating device converts a low continuous flow rate of liquid entering its inlet, through the flow control unit, to a high intermittent and pulsating flow rate that ejects from its outlet and flows from its outlet through the manifold inlet and through the normally-closed, pressure-compensated group of drippers connected to the manifold, out from the drippers, at a pressure-compensated low flow rate.

20 Claims, 1 Drawing Sheet

APPARATUS AND METHOD FOR OPERATING PRESSURE-COMPENSATED DRIPPERS AT LOW FLOW RATES

CROSS-REFERENCE TO RELATED APPLICATIONS

This application is a continuation of U.S. patent application Ser. No. 13/127,116, filed Jun. 30, 2011, now U.S. Pat. No. 8,794,539, which is a U.S. national stage application under 35 U.S.C. §371 of International Application No. PCT/IL2009/001022, filed Nov. 2, 2009, claiming priority to U.S. Provisional Application No. 61/198,252, filed Nov. 3, 2008, and U.S. Provisional Application No. 61/215,916, filed May 11, 2009, each of which is incorporated herein by reference in its entirety into this application.

FIELD OF THE INVENTION

The present invention relates to irrigation apparatus and method, and more particularly to an apparatus and method for operating pressure-compensated drippers at low flow rates.

The minimum flow of conventional pressure-compensated (PC) drippers used in irrigation is about 1 l/hr (liters/hour). The present invention is concerned with normally closed (NC) PC drippers (NCPC) that operate at relatively lower flow rates.

BACKGROUND OF THE INVENTION

The flow rates of conventional drippers and PC drippers are much higher than the required flow rates for meeting plants' water requirements. This is what makes drip irrigation systems complicated and expensive, and this is why drip irrigation systems are usually designed to operate in several sets using many automatic valves, irrigation computers, etc.

Water that flows from a single conventional dripper to the ground forms an onion-shaped wetted volume of soil. In light soils, the onion shape looks more like a long and narrow cylinder. Such long and narrow onion shapes waste substantial amounts of water and fertilizers by deep percolation.

As known, soils have limited capacity to store water. When water is applied in large quantities in each irrigation cycle, excess water is wasted by flowing below the plants' root zones.

Most plants develop much faster when the soil is kept continually at high humidity and at low water tension, while at the same time the soil is well-aerated.

When, e.g., a nursery includes 100,000 potted plants, in order to simultaneously irrigate the 100,000 plants using conventional PC drippers each operating at a flow of 1 l/hr, a total flow of 100,000 l/hr is required. If, instead, each dripper is operated at a PC flow of 0.1 l/hr, a total flow rate of only 10,000 l/hr is required for simultaneously operating the irrigation system.

PC drippers that operate at a low flow rate of lower than 0.5 l/hr, are not available in the market, because they are highly susceptible to plugging.

For different applications and for solving some of the above-described problems, there is a need for PC drippers that operate at relatively lower flows.

Therefore, the present invention relates to an apparatus and method for operating NCPC drippers at very low flow rates, for example, to flow rates of only 0.1 l/hr, or lower.

In accordance with the present invention there is therefore provided an apparatus for operating a group of normally closed, pressure compensated drippers at relatively low liquid flow rates, comprising a pulsating device having an inlet and an outlet that converts a low continuous liquid flow rate entering its inlet, through a flow control unit, to a high intermittent and pulsating flow rate ejected through its outlet, a manifold having an inlet connected to the outlet of said pulsating device, a group of normally-closed, pressure-compensated drippers connected to said manifold, wherein said pulsating device converts a low continuous flow rate of liquid entering its inlet, through the flow control unit, to a high intermittent and pulsating flow rate that ejects from its outlet and flows from its outlet through the inlet of said manifold and through said normally-closed, pressure-compensated group of drippers connected to said manifold, out from said drippers, at a pressure-compensated low flow rate.

The invention further provides a method of operating pressure-compensated drippers at low liquid flow rates, comprising providing one or more drip-lines, each drip-line including a first closed end and a second end, and a plurality of normally-closed, pressure-compensated drippers, connecting said second end to a pulsating device converting a low continuous flow rate of liquid entering the drip-line into a high, intermittent and pulsating flow of liquid, thereby liquid of high intermittent and pulsating flow is ejected from at least part of said normally-closed, pressure-compensated drippers.

The apparatus consists of a group of NCPC drippers connected, as will be described hereinafter, to the outlet of a pulsating device. Such NC drippers and pulsating devices are commonly available on the market, e.g., pulsators of the type described in the U.S. Pat. No. 5,507,436.

The pulsating device utilized in the present invention converts a low, continuous, controlled, relatively low flow rate entering its inlet to a high, intermittent, and pulsating flow ejected through its outlet. For example, by connecting a 2 l/hr flow control unit to the inlet of such a pulsating device, the pulsating device will convert the flow rate of the 2 l/hr dripper entering its inlet, to a high instant and pulsating flow rate of, e.g., 40 l/hr. By connecting a group of, e.g., 20 NCPC drippers, each of which operates at a nominal flow rate of 2 l/hr, to the outlet of such a pulsating device, each dripper in the group will operate at a flow rate of only 0.1 l/hr, and it will be PC.

In the previous example, each PC dripper in the group will operate at the same flow regardless of its elevation or the pressure at its inlet. Also the group of, e.g., 20 drippers are commercial NCPC drippers of 2 l/hr each, which are relatively less sensitive to plugging problems, yet each of them operates at a relatively low flow rate of only 0.1 l/hr.

The present invention relates to NCPC drippers, which drippers open themselves at a pre-set pressure. For example, the NCPC drippers will remain closed when the pressure at their inlet is lower than a pre-set pressure of, e.g., 0.3 bars. In such a case, at any pressure lower than 0.3 bars, the drippers will remain closed and no liquid will flow from their inlet through their outlet. In this example, liquid will flow through the outlet of the drippers only when the pressure at their inlet will be higher than 0.3 bars.

By changing the flow of the flow control unit at the inlet to the pulsating device, the flow of all the drippers in the group will change accordingly. For example, when a 4 l/hr unit at the inlet of a pulsating device controls the flow rate of a group of 100 NCPC 2 l/hr drippers, the flow rate of liquid through each dripper in the group will be 0.04 l/hr. By changing the unit at the inlet to the pulsating device from a 4 l/hr dripper to an 8 l/hr unit, the flow rate of each dripper in the group will change from 0.04 l/hr to 0.08 l/hr.

BRIEF DESCRIPTION OF THE DRAWINGS

The invention will now be described in connection with certain preferred embodiments with reference to the following illustrative figures so that it may be more fully understood. With specific reference now to the figures in detail, it is stressed that the particulars shown are by way of example and for the purpose of illustrative discussion of the preferred embodiments of the present invention only.

In the drawings.

DETAILED DESCRIPTION OF PREFERRED EMBODIMENTS

Figure 1:
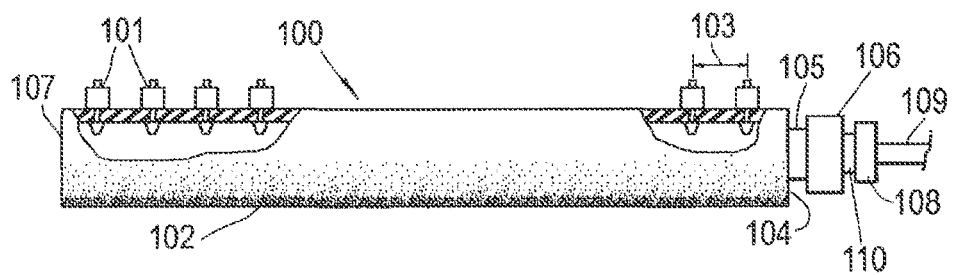
FIG. 1 illustrates, a front view, partially in cross section, of a pulsating drip-line with a group of on-line NCPC drippers connected to the outlet of a pulsating device.

Seen in FIG. 1 is a pulsating drip-line 100, which includes a group of on-line NCPC drippers 101, connected to a tubing 102 at a predetermined spacing 103 between the drippers 101. The group of PC drippers may include any desired number of units in each group, e.g., a group may include 10 drippers, 100 drippers, etc. One side, 104, of the tubing 102 is connected to an outlet 105 from a pulsating device 106, and the other side, 107, of the tubing 102, is plugged. The flow of liquid, e.g., liquid into the pulsating device 106 is controlled at a relatively low flow rate by means of a flow control unit 108 receiving liquid from a liquid line 109. The flow into the pulsating device can preferably be controlled at a relatively low rate by using a flow control unit, such as a dripper, a nozzle, or the like flow control devices. The liquid flows at a low rate through the unit 108 and enters the pulsating device 106 through its inlet 110. The pulsating device 106 converts the low flow rate of the unit 108 to a high, intermittent and pulsating flow rate that ejects through the outlet 105 from the pulsating device 106. From the outlet 105 of the pulsating device 106, the liquid continues to flow through the tubing 102 and through each dripper 101 of the group, at a PC low flow rate.

The group of PC drippers may include NCPC drippers with different properties. Each PC dripper in the group may operate at a different PC flow rate. For example, some may operate at a nominal PC flow rate of 2 l/hr., and some may operate at a nominal PC flow rate of 1 l/hr, etc.

The group of NCPC drippers can be connected to the outlet of the pulsating device by using different types of manifolds. The manifold can, for example, be a long, rigid or flexible tube with on-line NCPC drippers connected at any required spacing along the tube. It can also be a drip-line with in-line NCPC drippers inserted inside the tube, at any predetermined spacing. It can also be a small fitting with many distributed outlets at any desired spacing having drippers connected to each outlet.

In addition, the present invention also relates to drip-lines that always remain full of liquid, as well as to NCPC drippers that operate as a check valve and, in such drippers, liquid cannot flow back from their outlet through their inlet.

For some applications, non-PC drippers can be used, provided that the drippers are NC drippers. Such is the case when the volume of liquid stored in the manifold is much smaller than the volume of liquid that ejects from the pulsating device in each pulse. When, e.g., the volume of liquid that can be stored in the manifold is only 1 cc and the pulsating device ejects a volume of 40 cc in each pulse, then between two pulses the manifold will drain, and only 2.5% of the liquid will be lost.

Figure 2:
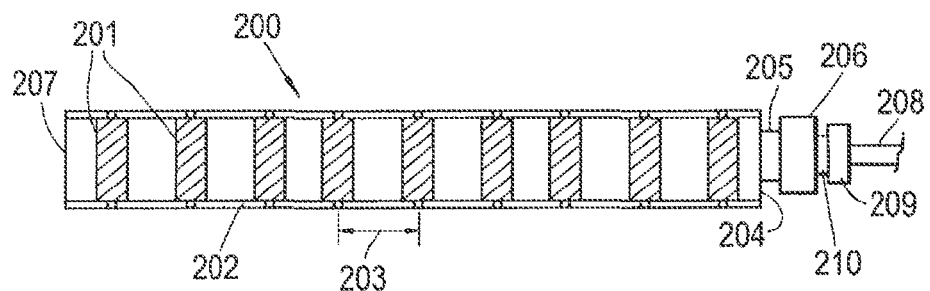
FIG. 2 Illustrates a front view, partially in cross section, of a pulsating drip-line with a group of in-line NCPC drippers connected to the outlet of a pulsating device.

FIG. 2 illustrates a pulsating drip line 200, which includes a group of in-line NCPC drippers 201, installed at predetermined spaced-apart relationship inside the tubing 202, at spacings 203. One side, 204 of the tubing 202, is connected to the outlet 205 from a pulsating device 206, and the other side, 207 of the tubing 202, is plugged. The flow of liquid into the pulsating device 206, receiving liquid from a liquid line 208, is controlled at a relatively low flow rate by means of a flow control unit 209. Liquid that flows though the unit 209 into the inlet 210 of the pulsating device 206 at a relatively low flow rate, is converted to a high, intermittent and pulsating flow rate and ejected through the outlet 205 of the pulsating device 206. From the outlet 205 of the pulsating device 206, the liquid continues to flow through the tubing 202 and through each dripper 201 in the group, at a PC low flow rate.

Figure 3:
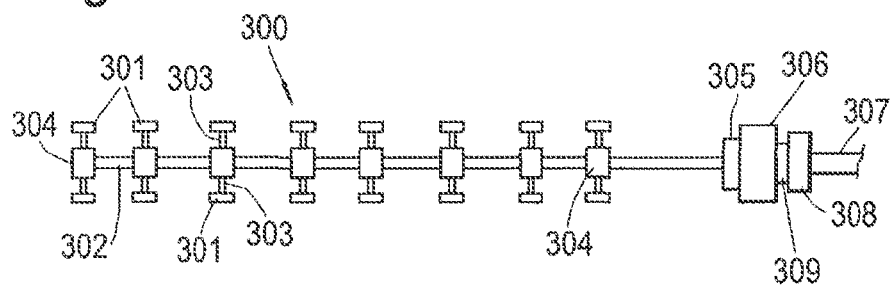
FIG. 3 illustrates a top view of pulsating on-line NCPC drippers which are commonly used for irrigating potted plants.

FIG. 3 illustrates an embodiment showing a pulsating manifold 300 with a group of NCPC drippers 301 which are connected to tubing 302 by means of secondary tube sections 303 and by means of suitable fittings 304. Tubing 302 is connected to the outlet 305 from a pulsating device 306. Liquid flows from a liquid line 307 through a control unit 308 and through a liquid inlet 309 to the pulsating device 306. From the pulsating device 306 the liquid continues to flow at a high instant flow rate through the outlet 305 into the tubing 302 and tubing sections 303, and out at a PC relatively low flow rate, through each of the drippers 301 in the group. Such pulsating drippers are especially useful for irrigating potted plants.

The method of operation of the NCPC drippers at low flow rates in accordance with the present invention, will now be described.

The minimum compensated pressure of NCPC drippers is the minimum pressure at which the flow rate through the dripper is PC. The minimum compensated operating liquid pressure is higher than the NC liquid pressure of the drippers. For example, the NC liquid pressure can be 0.3 bars and the minimum compensated pressure of the drippers can be 0.7 bars.

In the above example, the NCPC drippers will operate as follows:

a) at any pressure lower than, e.g., 0.3 bars, the drippers remain closed and no liquid will flow from their inlet through their outlet;

b) at any pressure higher than, e.g., 0.3 bars and lower than, e.g., 0.7 bars, liquid will flow out from the drippers, but the flow will not be PC, and c) at any pressure higher than, e.g., 0.7 bars, the flow rate through the drippers will be PC.

The NCPC drippers will start to operate only when the pressure of liquid inside the manifold is higher than the preset NC pressure of the drippers.

When using a pulsating device that ejects a relatively small volume of liquid in each pulse, small pockets of air in the liquid will eliminate the possibility of increasing the pressure in the manifold. In such a case, the small pocket of air will be compressed, and liquid entering the manifold will flow out through one or a few drippers in the group, without increasing the pressure inside the manifold. This problem can be solved by draining the air from the manifold, by providing an automatically operated air vent, or by using a pulsating device that ejects a relatively large volume of liquid in each pulse.

It will be evident to those skilled in the art that the invention is not limited to the details of the foregoing illustrated embodiments and that the present invention may be embodied in other specific forms without departing from the essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A system, comprising:
a pulsating device having an inlet and an outlet;
a flow control unit connected to the inlet of the pulsating device;
a manifold connected to the outlet of the pulsating device;
a plurality of normally-closed, pressure-compensated drippers connected to the manifold;
wherein the pulsating device is structured such that a low continuous flow of liquid entering the pulsating device through the flow control unit can be converted by the pulsating device to a high intermittent and pulsating flow of liquid from the outlet of the pulsating device into the manifold and out from the plurality of normally-closed, pressure-compensated drippers connected to the manifold at a pressure-compensated flow rate.

2. The system according to claim 1 wherein each dripper of the plurality of normally-closed, pressure-compensated drippers is positioned on-line such that each dripper crosses an outer wall of the manifold at only one location.

3. The system according to claim 1 wherein each dripper of the plurality of normally-closed, pressure-compensated drippers is positioned in-line such that each dripper crosses an outer wall of the manifold at two locations.

4. The system according to claim 1 wherein at least some drippers of the plurality of normally-closed, pressure-compensated drippers are connected to the manifold through secondary tubing sections.

5. The system according to claim 4 wherein the secondary tubing sections are connected to the manifold through suitable fittings.

6. The system according to claim 1 wherein the manifold is dimensioned such that the volume of liquid that can be stored inside the manifold is smaller than the volume of liquid that is ejected from the pulsating device in each pulse.

7. The system according to claim 1 wherein only one pulsating device is coupled to the manifold, and wherein the manifold is structured to remain substantially full of liquid during operation.

8. The system according to claim 1 further comprising an automatically operated air vent for eliminating pockets of air in the system.

9. The system according to claim 1 wherein the outlet is positioned at a first end of the pulsating device, and the inlet is positioned at a second end of the pulsating device opposite the first end of the pulsating device.

10. The system according to claim 1 wherein the pulsating device includes only one outlet.

11. The system according to claim 1 wherein the manifold includes only one lumen.

12. The system according to claim 1 wherein the plurality of normally-closed, pressure-compensated drippers connected to the manifold includes at least 100 normally-closed, pressure-compensated drippers.

13. An irrigation system, comprising:
a pulsating device having an inlet at a first end of the pulsating device and an outlet at a second end of the pulsating device opposite the first end of the pulsating device;
a flow control unit connected to the pulsating device at the inlet of the pulsating device;
a manifold connected to the pulsating device at the outlet of the pulsating device;
a plurality of normally-closed drippers connected to the manifold;
wherein the pulsating device is structured such that a low continuous flow of liquid entering the pulsating device through the flow control unit can be converted by the pulsating device to a high intermittent and pulsating flow of liquid from the outlet of the pulsating device into the manifold and out from the plurality of normally-closed drippers connected to the manifold.

14. The system according to claim 13 wherein the plurality of normally-closed drippers are pressure-compensated drippers, and wherein the pulsating device is structured such that the low continuous flow of liquid entering the pulsating device through the flow control unit can be converted by the pulsating device to the high intermittent and pulsating flow of liquid from the outlet of the pulsating device into the manifold and out from the plurality of normally-closed drippers connected to the manifold at a pressure-compensated flow rate.

15. A method for providing water to a plurality of plants comprising:
positioning a plurality of normally-closed, pressure compensated drippers proximate to the plurality of plants, wherein each dripper of the plurality of normally-closed, pressure compensated drippers is connected to a manifold;
supplying liquid to a pulsating device, wherein the pulsating device has an outlet connected to the manifold and an inlet connected to a flow control unit, such that a low continuous flow rate of liquid enters the pulsating device through the flow control unit and is converted into a high, intermittent and pulsating flow of liquid that is ejected from the pulsating device into the manifold and results in a pressure-compensated low flow rate of liquid through the plurality of normally-closed, pressure-compensated drippers.

16. The method according to claim 15 wherein each dripper of the plurality of normally-closed, pressure-compensated drippers operates at the same flow rate regardless of its elevation or the pressure at its inlet when liquid flows through the plurality of normally-closed, pressure-compensated drippers.

17. The method according to claim 16 further comprising changing the flow rate at which each dripper of the plurality of normally-closed, pressure-compensated drippers operates by exchanging the flow control unit with a second, different flow control unit at the inlet of the pulsating device.

18. The method according to claim 15 wherein only one pulsating device is connected to the manifold, and wherein the manifold has only one lumen.

19. The method according to claim 15 wherein the manifold remains full of liquid during operation.

20. The method according to claim 15 wherein the plurality of normally-closed, pressure-compensated drippers connected to the manifold includes at least 100 normally-closed, pressure-compensated drippers, and wherein the high, intermittent and pulsating flow of liquid is ejected from the pulsating device into the manifold and results in the pressure-compensated low flow rate of liquid through the at least 100 normally-closed, pressure-compensated drippers.

* * * * *